US008982131B1

(12) United States Patent
Maswadeh et al.

(10) Patent No.: US 8,982,131 B1
(45) Date of Patent: Mar. 17, 2015

(54) MULTIVARIATE DIGITAL CAMERA DEVICE AND METHOD FOR GENERATING 2D AND 3D PICTURES OF DATASETS COMPRISED OF POINTS IN HYPERSPACE

(71) Applicant: U.S. Army Research Development and Engineering Command, Washington, DC (US)

(72) Inventors: Waleed M. Maswadeh, Rosedale, MD (US); Arnold P. Snyder, Bel Air, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 243 days.

(21) Appl. No.: 13/804,808

(22) Filed: Mar. 14, 2013

(51) Int. Cl.
  G06T 11/20 (2006.01)
  G06F 17/10 (2006.01)
  G06F 15/18 (2006.01)
  G06N 7/08 (2006.01)
  H04N 5/247 (2006.01)

(52) U.S. Cl.
  CPC .................................. H04N 5/247 (2013.01)
  USPC .................. 345/440; 345/441; 703/2; 706/6; 706/13

(58) Field of Classification Search
  CPC combination set(s) only.
  See application file for complete search history.

(56) References Cited

U.S. PATENT DOCUMENTS

| 7,659,895 | B2 * | 2/2010 | Kandogan | 345/440 |
| 2010/0274539 | A1 * | 10/2010 | Virkar et al. | 703/2 |

OTHER PUBLICATIONS

Grinstein, et al (Aug. 2001). "High-dimensional visualizations" In Proceedings of Workshop on Visual Data Mining, ACM COnference on Knowledge Discovery and Data Mining (pp. 1-14).*
Lesoinats, et al. "DD-HDS: A method for visualization and exploration of high-dimensional data". Neural Networks, IEEE Transactions on 18.5 (2007): 1265-1279.*
Wirsz, et al. "Application of pattern recognition and factor analysis to inductively coupled plasma optical emission spectra." Analytical Chemistry 58.1 (1986): 51-57.*
Van Heel, et al. "Multivariate statistical analysis in single particle (cryo) electron microscopy." Handbook on DVD 3D-EM in Life Sciences (2009).*

* cited by examiner

Primary Examiner — Devona Faulk
Assistant Examiner — Zhitong Chen
(74) Attorney, Agent, or Firm — Ulysses John Biffoni

(57) ABSTRACT

A multivariate digital camera device and method for generating pictures of datasets comprised of points in hyperspace is provided. The invention may be embodied in an input device, a computer processor, and an output device. The input device may be a keyboard, a laboratory instrument such as a mass spectrometer, a reader of computer readable medium, or a network interface device. The output device may be a monitor used in conjunction with either a 2D or 3D printer or both. The computer processor receives data from the input device and performs a series of steps to create a 2D or 3D image of the hyperspace object. The resulting image is then produced in a non-transitory medium by at least one of the output devices. The processor steps include the use of a maximum distance method in which distances and angles information from the points in the hyperspace dataset are preserved to produce a more picture-like quality.

6 Claims, 10 Drawing Sheets

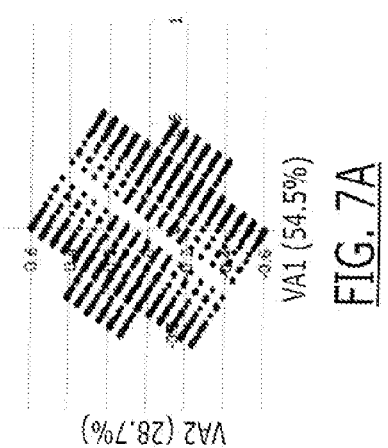
FIG. 7A
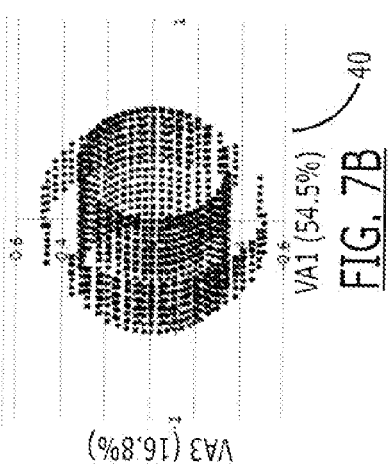
FIG. 7B
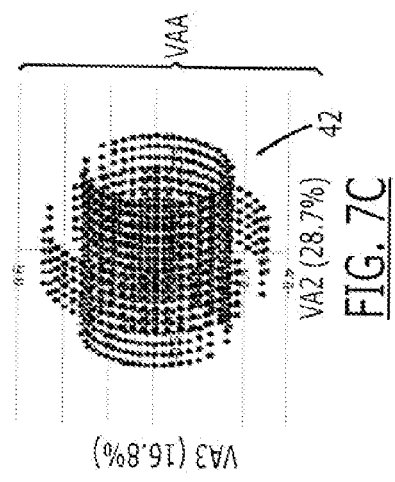
FIG. 7C
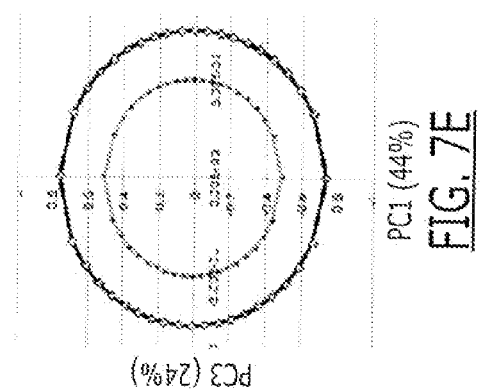
FIG. 7D
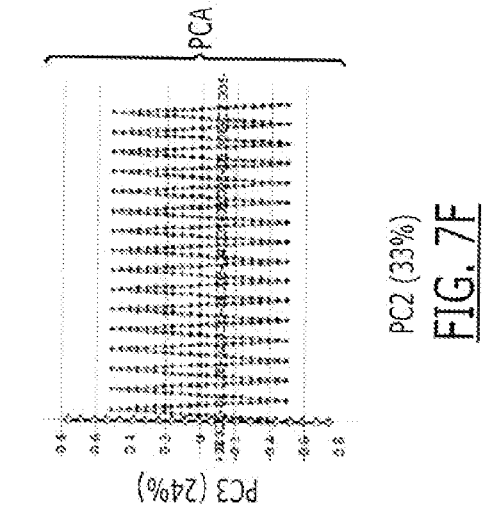
FIG. 7E
FIG. 7F

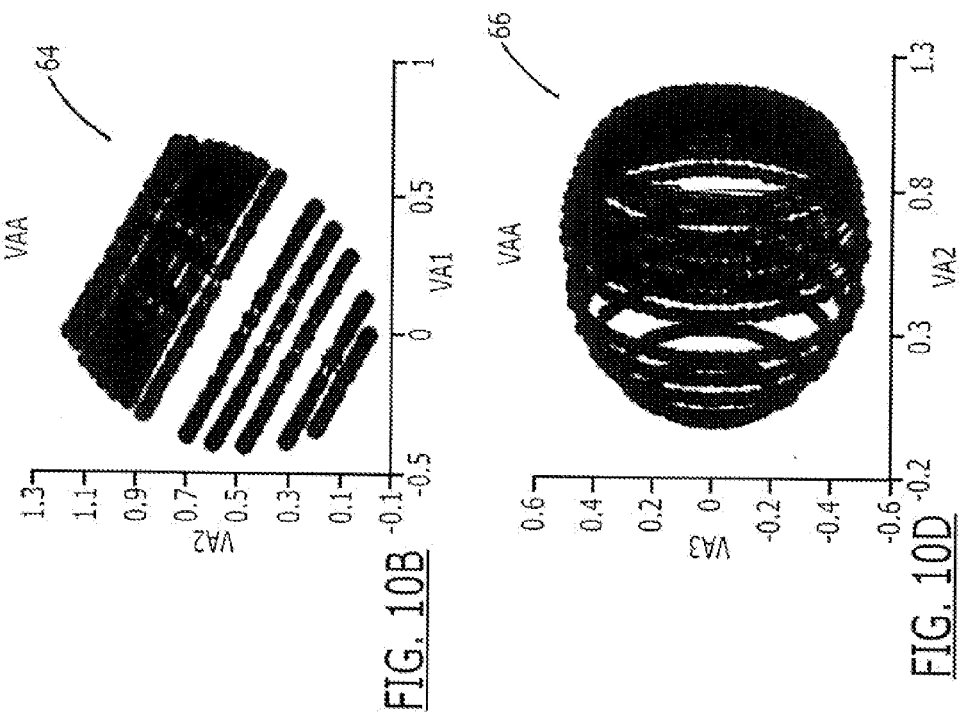
FIG. 10A
FIG. 10B
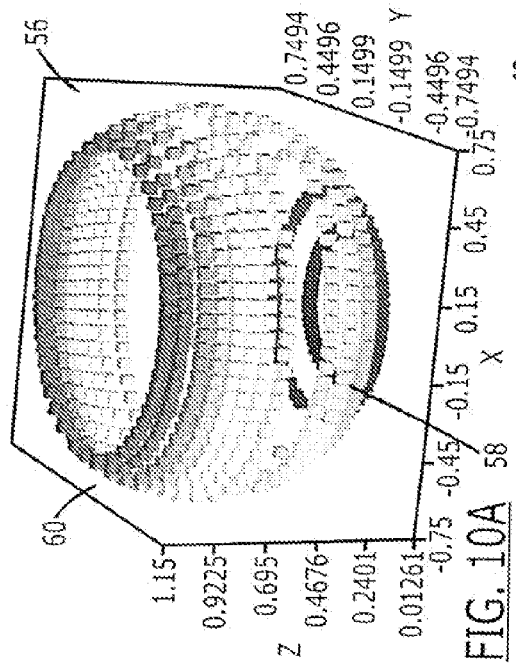
FIG. 10C
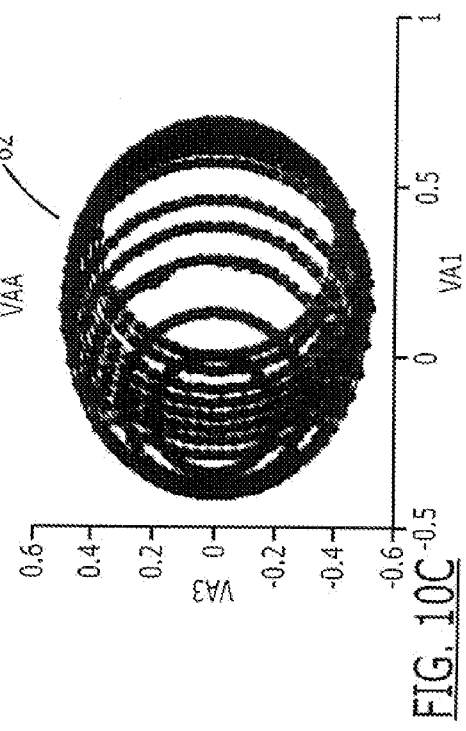
FIG. 10D

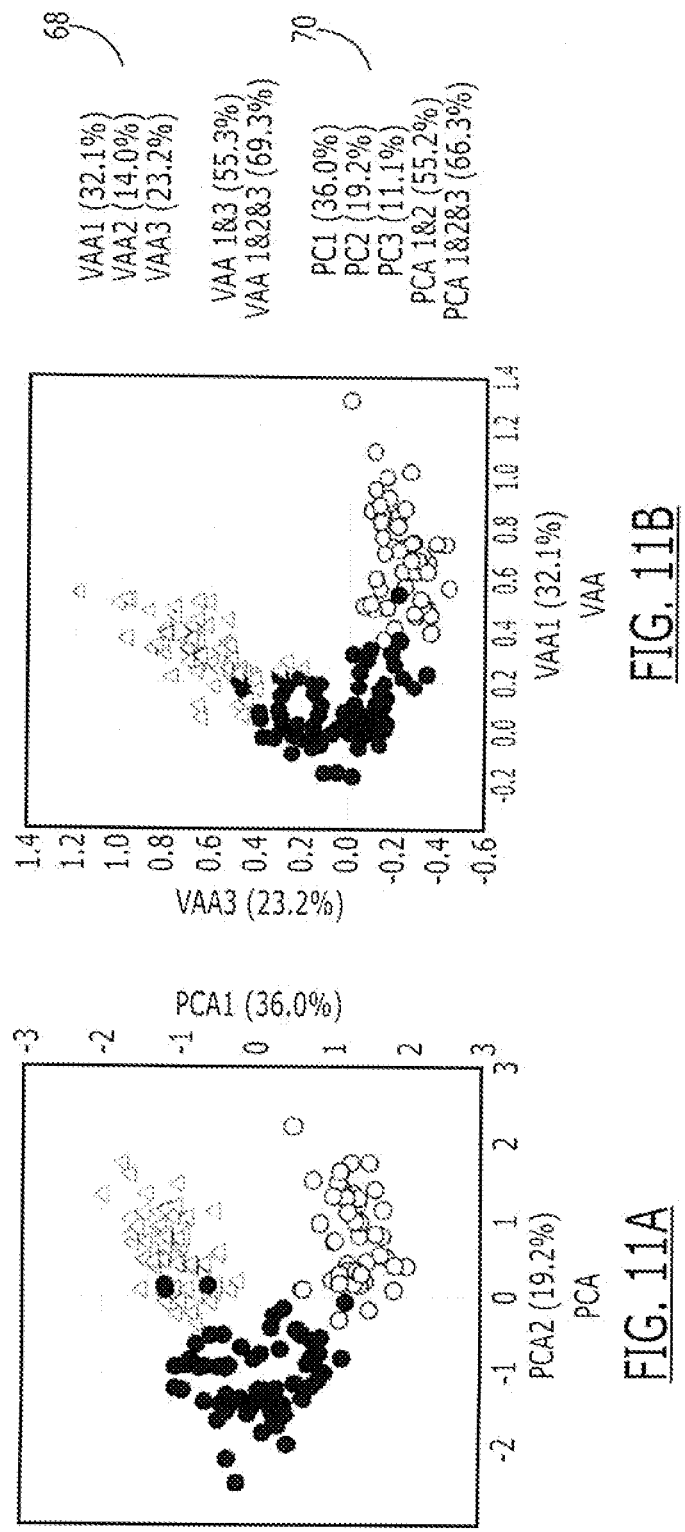

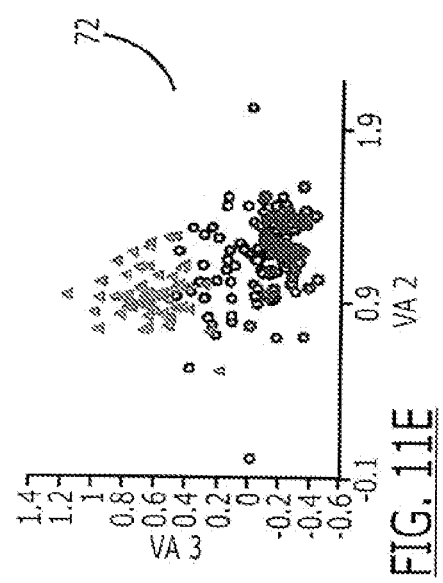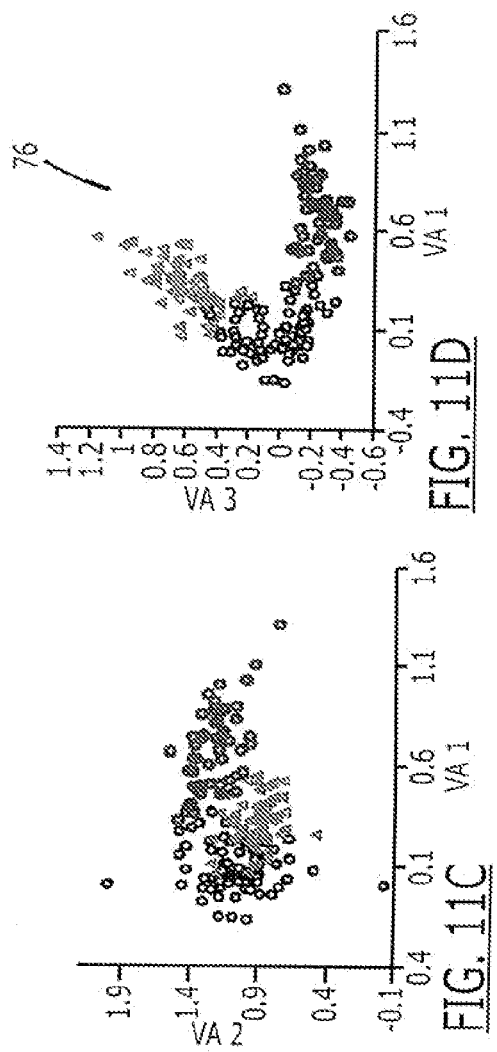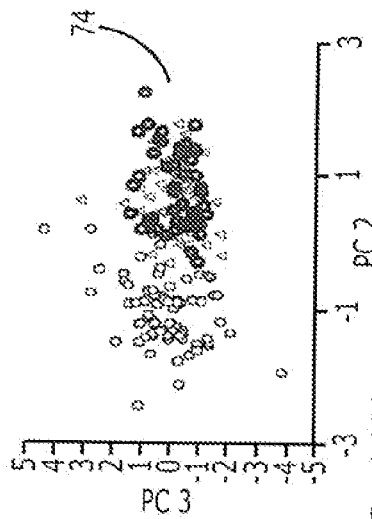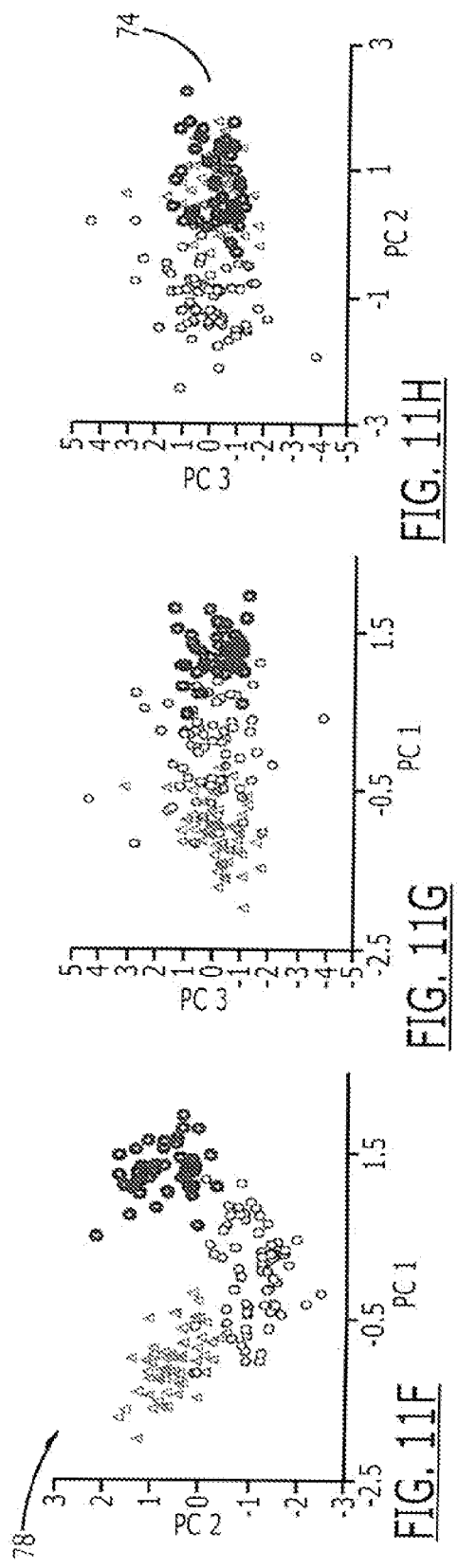

MULTIVARIATE DIGITAL CAMERA DEVICE AND METHOD FOR GENERATING 2D AND 3D PICTURES OF DATASETS COMPRISED OF POINTS IN HYPERSPACE

GOVERNMENT INTEREST

The present invention may be manufactured, used, and/or licensed by or for the United States Government without the payment of royalties thereon.

BACKGROUND

1. Technical Field

The present invention relates generally to a multivariate digital camera device and method for generating pictures of datasets comprised of points in hyperspace using an input device, a computer processor, and an output device to produce 2D and 3D representations of the datasets.

2. Description of the Related Art

Research studies and experiments in various scientific disciplines require the analysis of datasets comprised of points in hyperspace. The term "hyperspace" is defined herein as the mathematical construct of four or more dimensional space in contrast to a two- and three-dimensional space, referred to herein as 2D and 3D, respectively. Such datasets to be analyzed consist of points defined by four or more variables, also referred to herein as multivariate data, which can be denoted as $(x, y, z, \ldots, n)$ where x represents the first variable, y represents the second variable, z represents the third variable, and so forth up to a variable denoted here as n. The challenge in analyzing such datasets is that humans can only visualize 2D and 3D objects. With the exception of using time as the fourth dimension, humans cannot visualize multivariate datasets without some form of dimensional reduction, projection, mapping, or illustration tool that reduces the multivariate data to either 2D or 3D form.

Scientists and mathematicians have developed methods to help visualize an object or collection of points in hyperspace by reducing the dataset to a 2D or 3D rendering. Such methods can be referred to generally as multivariate data analysis (MVA). Conventional MVA, also referred to herein as principal component analysis (PCA), finds a first principal component or factor vector in the hyperspace dispersion of points. This procedure uses all the points in the dataset and a line is drawn through hyperspace. All points are projected onto that line by perpendicular lines that cut or intersect with the introduced vector. The vector is rotated such that the intersections of the projected points onto a principal component vector create the widest dispersion of their projections onto the principal component vector. That vector is named the first principal component or first factor. The next or second factor or principal component by definition is perpendicular to the first. As with the first vector, points are projected onto this second line until the orientation of the line or vector is such that the intersection of the projected points onto the vector creates the widest dispersion of projections on the principal component vector. That vector is named the second principal component or second factor. This continues for the third factor and higher factors until all factors are obtained for the multivariate data. That is, if the multivariate data are in or representative of ten dimensions (n=10), then the process is continued until ten factors are obtained.

The prior art PCA method described above relies on obtaining and using a depth parameter for visualization of a hyperspace object in 2D or 3D. Unlike a multivariate camera, the relative distances and angles of each point in a hyperspace object are not measured and retained. Therefore all points of the hyperspace object are not individually imaged into or onto a 2D or 3D format for human visualization. The term "format" and "surface" may be used interchangeably in this context.

Another type of related prior art method involves use of a dendrogram. A dendrogram is a tree diagram that can be used to illustrate the arrangement of hierarchical clustering. While providing useful information about the hyperspace data, this prior art method uses the Euclidean distances between points in hyperspace in order to derive the hierarchical clustering to be illustrated. The angles formed by the lines connecting points in hyperspace are not used to guide and orient distance projections, so any information or insight to be gained by such data are not present in the resulting dendrogram.

Accordingly, there is a need for a multivariate digital camera device and method that utilizes both the distances data as well as the angles data from each point in the dataset to generate 2D and 3D pictures of hyperspace objects.

SUMMARY

In view of the foregoing, an exemplary embodiment of a multivariate digital camera device and method for generating pictures of datasets comprised of points in hyperspace is provided. The invention may be embodied in an input device, a computer processor, and an output device. The input device may be a keyboard, a laboratory instrument such as a mass spectrometer, a reader of computer readable medium, or a network interface device. The output device may be a monitor used in conjunction with a either to 2D or 3D printer or both. The computer processor receives data from the input device and performs a series of steps to create a 2D or 3D image of the hyperspace object. The resulting image is then produced in a non-transitory medium by at least one of the output devices. The processor steps include the use of a maximum distance method in which distances and angles information from the points in the hyperspace dataset are preserved to produce a more picture-like quality.

These and other aspects of the embodiment herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the present invention includes all such modifications.

BRIEF DESCRIPTION OF THE DRAWINGS

The patent or application file contains at least one drawing executed in color. Copies of this patent or patent application publication with color drawing(s) will be provided by the office upon request and payment of the necessary fee.

FIGS. 7A through 7F show a comparison of visualizations of the cylinder within a cylinder dataset illustrated in FIG. 5 using the present invention and the PCA prior art.

FIGS. 10A through 10D show a plot of a 3D dataset known as the punctured-sphere model with a comparison of visualizations of the punctured-sphere model dataset using the present invention and the PCA prior art.

FIGS. 11A through 11H show a comparison of visualizations of the Italian wine dataset using the present invention and the PCA prior art.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the present invention. Accordingly, the examples should not be construed as limiting the scope of the present invention.

Figure 1:
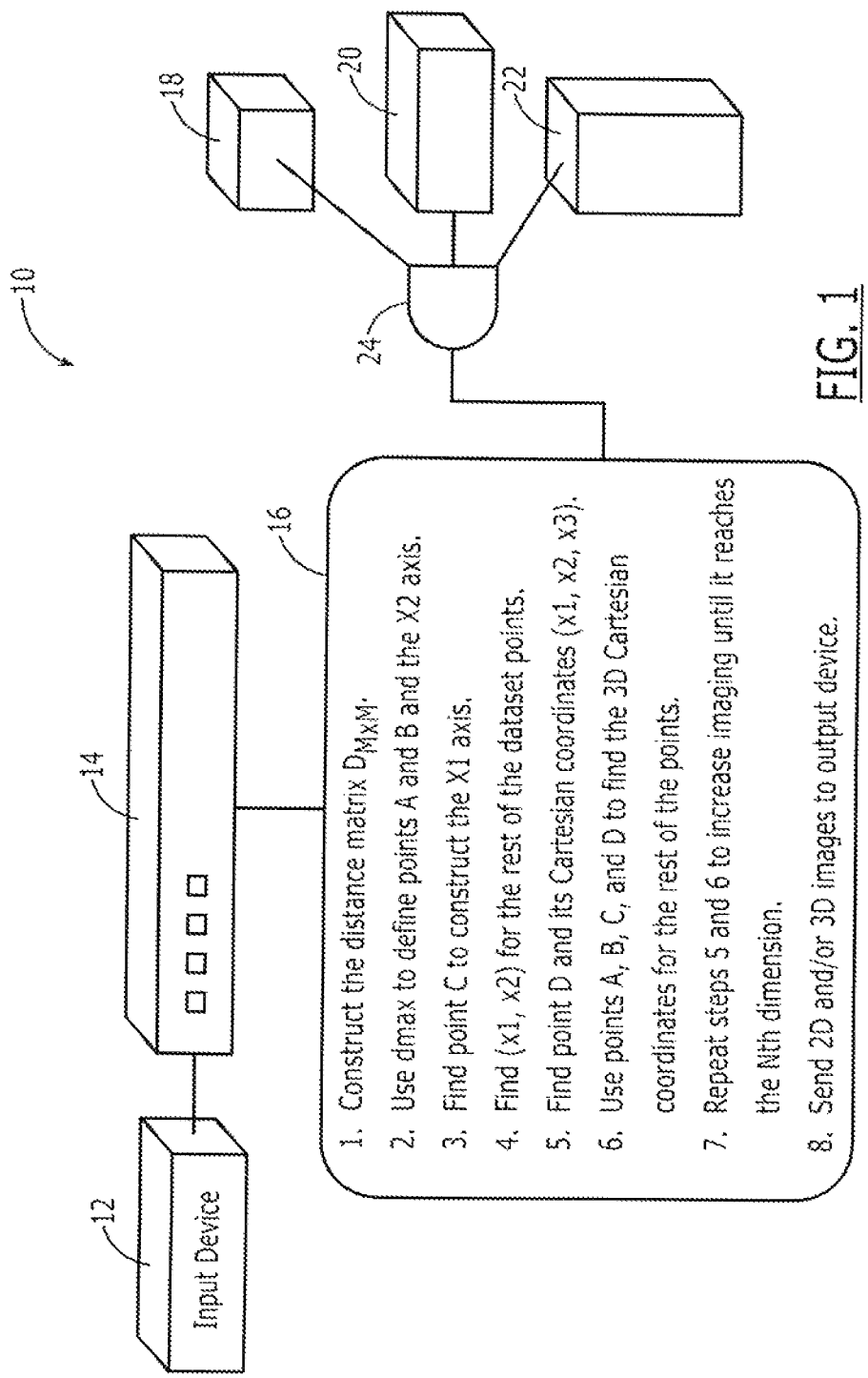
FIG. 1 is a schematic illustration of an exemplary embodiment of the present invention showing both hardware components and processing steps.

Turning to FIG. 1, an exemplary embodiment of a multivariate digital camera device 10 and method for generating pictures of datasets comprised of points in hyperspace is illustrated in schematic form. As used herein, the term "multivariate" may be used interchangeably with the term "hyperspace." The present invention may be embodied as illustrated here as an input device 12, a computer processor 14 which performs process steps 16, and one or more output devices 18, 20, 22. Computer processor 14 and its process steps 16 may communicate data directly to output devices 18, 20, 22 or through an output controller 24 for data manipulating and formatting. The output controller 24 may be a software product running on computer processor 14 or a combined software-hardware device, either of which are commercially available and well known in the art to which the invention applies.

Input device 12 in the present invention functions similarly to an aperture in a conventional camera. That is, it provides the raw dataset to be imaged to device 10, input device 12 may be a keyboard, a laboratory instrument such as a mass spectrometer, a reader of computer readable medium, or a network interface device. Such input devices are commercially available and their use is well known in the art to which the present invention applies.

Output devices 18, 20, 22 in the present invention are used to create a picture or image of the hyperspace dataset or object in either 2D format or 3D format. The present invention may utilize a plurality of output devices to provide the user with a choice of viewing options in visualizing and analyzing the hyperspace dataset. For example, output devices illustrated in FIG. 1 include a monitor 18, a 2D printer 20, and a 3D printer 22. The 3D printer is also referred to as an additive manufacturing device. Such output devices can produce a 3D object of solid, tangible material. Thus, both the 2D printer 20 and the 3D printer 22 produce an image of the hyperspace dataset in a non-transitory medium. For the 2D printer 20, the non-transitory medium is typically paper or another flat medium such as vellum or polyester film. For the 3D printer 22, the non-transitory medium is typically a plastic, metal, ceramic, or composite material used to form a 3D object. Such 3D printers or additive manufacturing devices are commercially available and their use is well known in the art to which the present invention applies.

Computer processor 14 in the present invention receives data from input device 12, which as noted above serves as the equivalent of an aperture in a conventional camera. Having received this data, computer processor 14 the performs a series of steps as will be fully described below to create a 2D and/or 3D image of the hyperspace object. The resulting image is then produced in a non-transitory medium by one or more of the output devices 20, 22. The monitor of output device 18 provides visualization capability in a transitory medium. That is, the images produced by output device 18 are displayed on a monitor screen. This monitor imaging capability may be used to view and manipulate the 2D and 3D images of the hyperspace object for analyzing the dataset and selecting the perspective for the 2D and 3D print in a non-transitory medium using output devices 20 and/or 22.

Having provided an overview of the present invention, attention is now turned to a detailed description of the processor steps taught herein starting with a background of multivariate analysis and visualization.

It is well known that a 2D object can be defined by the coordinates along two axes at right angles to each other and that a 3D object can be defined by the coordinates along three axes, each at right angles to the other two axes. Similarly, a 4D hyperspace object can be defined mathematically by four axes, each at right angles to the other three axes. This 4D object or illustration cannot be visualized by a human, but it can be created in mathematical space. This hyperspace construct can be conceptualized in 3D as a constellation of points mapped within the visualized 3D points. That is, a point that can be visualized in 3D is assumed to possibly represent a plurality or constellation of points in the fourth dimension. This conceptualization can be extended to any hyperspace dimension and therefore is not limited to 4D.

In the present invention, after receiving a hyperspace dataset from input device 12, the first step in processor steps 16 serves to calculate and preserve the distances between any two points in the hyperspace dataset. This is done by construction of a distance matrix. The distance matrix that is constructed is an x by x matrix, where x equals the number of experimental points in the hyperspace dataset.

By way of example, a hyperspace dataset could include the data measured by a mass spectrometer. The dataset from a mass spectrometer can be thought as consisting of many variables, which may be denoted as mass 100=variable 1, mass 101=variable 2, mass 102=variable 3, and so forth. Each mass can be considered as representing a dimension or axis in hyperspace. As a processing step, the axes can be normalized in intensity units. That is, the axes can be scaled based upon the experimental measurements so that each axis spans from zero to one in magnitude.

To continue the example, suppose that six different samples are submitted to a mass spectrometer. Suppose they result in six masses or variables, denoted as 100, 101, 102, 103, 104, and 105. Also suppose that the first and second samples have values or coordinates as follows: Sample 1=(mass, normalized intensity)=(100, 0.1), (101, 0.3), (102, 0.5), (103, 1.0), (104, 0.7), (105, 0). Sample 2=(100, 0.3), (101, 0), (102, 0.2), (103, 0.8), (104, 0), (105, 0.6).

Basic plotting in hyperspace translates each spectrum measured value to a single point in hyperspace. Therefore, for sample 1, a point denoted as x=0.1 can be placed at 0.1 intensity units on the mass 100 first dimension axis. Similarly, a point denoted as y=0.3 can be placed 0.3 intensity units on the mass 101 second dimension axis, and a point denoted as z=0.5 can be placed 0.5 intensity units on the mass 102 third dimension axis. This results in a point in 3D space denoted as (x,y,z)=(0.1, 0.3, 0.5), which can readably be visualized in a 2D or 3D illustration of the data.

The challenge in visualizing the dataset begins when the fourth dimension axis is created for Mass 103. Mathematically, a fourth dimension axis is created and a point denoted as n=1.0 is mathematically placed 1.0 intensity units along the fourth dimension axis to correspond to the value measured as Mass 103. This is a common procedure in mathematical dataspace plotting, however, this fourth dimension and higher dimensions cannot be visualized in raw form. In this example, the process continues for mass 104 and 105, thus resulting in a fifth and sixth dimension axis, respectively. All six axes are perpendicular to each other, mathematically, by definition even though the six axes cannot be viewed together. The challenge then is in providing a meaningful and useful 2D and/or 3D representation of this dataset that preserves as much of the multivariate information as possible and minimizes the dilution of information as displayed.

The processing steps of the present invention utilize a matrix, denoted as $R_{M \times N}$, to model or represent any object, shape, or collection of points in hyperspace as received from input device 12. In this notation, the N columns correspond to the number of variables or axes and the M rows correspond to the number of points in the hyperspace dataset. That is, the hyperspace object thus modeled is represented by M points that comprise the dataset. This could be a set of mass spectrum data points as in the example above (M=2 or number of samples, N=6 or number of masses) or any other hyperspace dataset.

An optional step in the present invention is to standardize the columns of the $R_{M \times N}$ matrix. The most common standardization technique is by subtracting the mean of the data in a column from all column entries, also known as centering, and then dividing that value by the standard deviation of the column data, also known as scaling. The drawback of scaling a variable with a standard deviation is when the variance of the data is small. Division by a small standard deviation will inflate that variable's variance in comparison with other variables. Accordingly, the standardization technique chosen here, if used, is the unity scale of zero to one. To scale values in each column of the $R_{M \times N}$ matrix, equation 1 can be used in which Max equals the maximum value in the column to be scaled and Min equals the minimum value in the column to be scaled.

$$\text{Scaled Value} = (\text{Value} - \text{Min})/(\text{Max} - \text{Min}) \quad (1)$$

Whether or not data standardization was performed as described above, the present invention utilizes a distance matrix to preserve the distance between any two points in the hyperspace dataset. Calculation of the distance matrix, denoted herein as $D_{M \times M}$, is therefore labeled step 1 in the process steps 16 of FIG. 1. The subscript M represents the number of points in hyperspace corresponding to the original data matrix $R_{M \times N}$. Each entry in the distance matrix, denoted as (p, q), corresponds to the calculated distance between points p and q. The distance between any two points is calculated using the Euclidean distance equation as illustrated in equation 2 of Table 1.

TABLE 1

Euclidean distance equation.

$$d(p, q) = d(q, p) = \sqrt{(q_1 - p_1)^2 + (q_2 - p_2)^2 + \ldots + (q_n - p_n)^2} = \sqrt{\sum_{i=1}^{n} (q_i - p_i)^2} \quad (2)$$

The distance matrix $D_{M \times M}$ can be further reduced into a diagonal matrix given that it is always a symmetrical matrix with the values of $d_{i,j} = d_{j,i}$. Such use of its symmetry can result in memory space and processor time savings in storing and manipulation of the data. Use of the distance matrix $D_{M \times M}$ as defined in Table 1 and taught herein preserves the distances between all points in the hyperspace.

To preserve the relative angles between all the points in the dataset, as well as the distances, the following approach is performed by the present invention.

Figure 2:
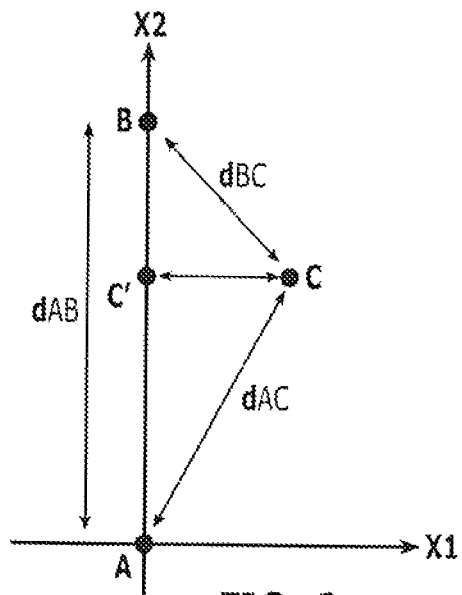
FIG. 2 is an illustration showing how the X2 axis is created from dataset points A and B and how the X1 axis is created from dataset points A, B and C and the X2 axis.

Turning to FIG. 2, an illustration of how the X2 axis is created in the present invention is provided. In this step, denoted as processor step 2, the maximum distance $d_{max}$ in distance matrix $D_{M \times M}$ is used to define points A and B, and to thus locate the X2 axis. As illustrated, the X2 axis intersects points A and B from the dataset. Points A and B are selected as those two points in the hyperspace dataset that have the maximum distance between them, $d_{max}$, as illustrated and labeled in FIG. 2 as $d_{AB}$. The X2 axis, also referred to as the y-axis, is thus defined by a line intersecting the two points A and B. Such a line is unique in hyperspace as well as 2D and 3D space. The distance between points A and B can be denoted as $AB = d_{AB} = d_{max}$. Given that each entry in the distance matrix, which is denoted as entry (p, q), corresponds to the calculated distance between points p and q, the maximum value in the distance matrix $d_{max} = d_{AB}$ identifies the two end points A and B. That is, the (p, q) location of the maximum value in the distance matrix identifies point A as corresponding to the row denoted as p. Similarly, point B is identified as corresponding to the column denoted q. Computer processor routines to find the maximum value in a matrix and to identify the corresponding points, which equate to the row and column location within the matrix, are well known in the art to which the invention applies.

Returning to FIG. 2, an illustration of how the X1 axis is created and datasets points are mapped into the 2D surface or space defined by X1 and X2 is provided. In what is referred to herein as processor step 3, to point C is found in the dataset such that the perpendicular distance from point C to a point C' on line AB is the maximum distance possible from the dataset of points. The X1 axis, also referred to as the x-axis, is constructed parallel to the two points C and C', as shown in FIG. 2. The mathematical equations to find points C and C' on line AB as illustrated in FIG. 2 are well known in the art to which the invention applies.

In processor step 4, the Cartesian coordinates of point A are defined as the (0, 0, 0) location in 3D space. The Cartesian coordinates of point B are therefore (0, AB, 0) for a 3D space, where AB represents the distance between points A and B or $d_{AB}$. Similarly, the Cartesian coordinates of point C are (CC', AC', 0) or $(X1_C, X2_C, 0)$ for a 3D space. The values of $X1_C$ and $X2_C$ are calculated in step 3 using the distance equations 2a and 2b, respectively, as provided in Table 2.

TABLE 2

Distance Equations.

$$X2_C = AC' = (AC^2 + AB^2 - BC^2)/(2AB) \quad (2a)$$
$$X1_C = (CC')^2 = AC^2 - (AC')^2 = AC^2 - [(AC^2 + AB^2 - BC^2)/(2AB)]^2 \quad (2b)$$
Where: $AB = d_{A,B}$, $AC = d_{A,C}$, $BC = d_{B,C}$, $CC' = d_{C,C}$, $AC' = d_{A,C}$, $BC' = d_{B,C}$, and $CC' = d_{C,C}$.

Figure 3:
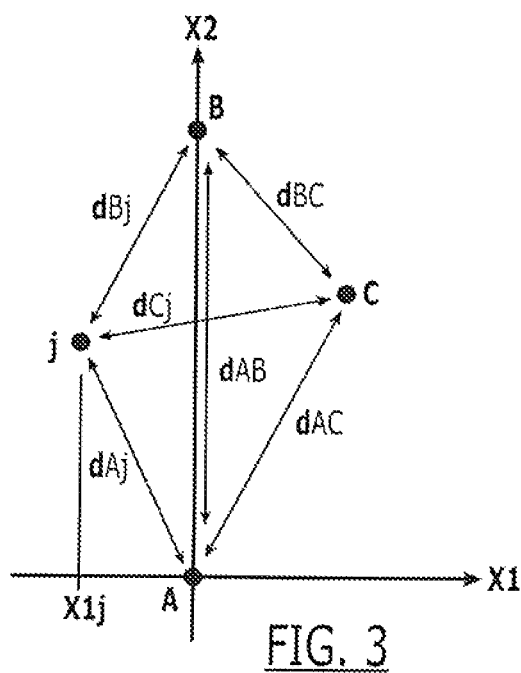
FIG. 3 is an illustration showing how the X1 and X2 values are created for all dataset points, illustrated by point j, using points A, B and C and the X1 and X2 axes.

Turning to FIG. 3, an illustration showing how points A, B and C are used to find the Cartesian coordinates in the X1-X2 plane for the rest of the points in the dataset. The total number of such dataset points is M−3, where M is the total number of points in the original dataset. The method illustrated here preserves both distances and angles information from each point in the dataset. The X1 and X2 values of any point, denoted and illustrated here as point j, are calculated in processor step 4 using equations 3a and 3b as provided in Table 3.

TABLE 3

Cartesian Coordinates $$X2_j = (AB^2 + Aj^2 - Bj^2)/(2 * X2_B) = (AB^2 + Aj^2 - Bj^2)/(2AB) \quad (3a)$$
$$X1_j = (AC^2 + Aj^2 - Cj^2 - 2 * X2_C * X2_j)/(2 * X1_C) \quad (3b)$$
$$X3_j^2 = Aj^2 - X1_j^2 - X2_j^2 \quad (3c)$$
Where: $AB = d_{A,B}$, $AC = d_{A,C}$, $BC = d_{B,C}$, $Cj = d_{C,j}$, $Aj = d_{A,j}$, $Bj = d_{B,j}$, and $Cj = d_{C,j}$ and $X1_C$ and $X2_C$ are from equation 2.

Figure 4:
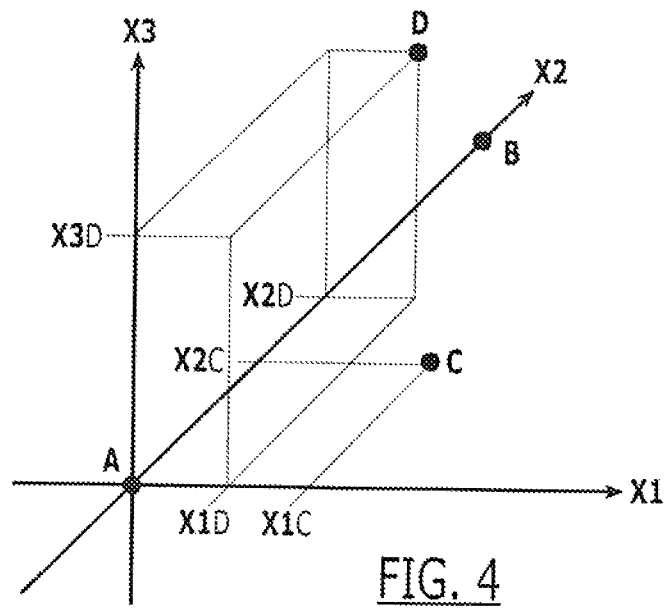
FIG. 4 is an illustration showing how the X3 axis is created in the present invention from dataset point D and the X1 and X2 axes.

Turning to FIG. 4, a processor step 5 is illustrated in which a point D is found such that the perpendicular distance from point D to the A-B-C plane or X1-X2 plane is maximum. This is done using equation 3c in Table 3. The j point having that maximum distance, denoted as $X3_j$, is labeled point D. The Cartesian coordinates of point D are denoted as ($X1_D$, $X2_D$, $X3_D$) for a 3D space as illustrated in FIG. 4 and are calculated using equations 4a-c in Table 4.

TABLE 4

Cartesian Coordinates of Maximum Distance Point D $$X2_D = (AB^2 + AD^2 - BD^2/(2 * X2_B) = (AB^2 + AD^2 - BD^2)/(2AB) \quad (4a)$$
$$X1_D = (AC^2 + AD^2 - CD^2 - 2 * X2_C * X2_D)/(2 * X1_C) \quad (4b)$$
$$X3_D = [AD^2 - X1_D^2 - X2_D^2]^{1/2} \quad (4c)$$
Where: $AB = d_{A,B}$, $AC = d_{A,C}$, $BC = d_{B,C}$, $Cj = d_{C,j}$, $Aj = d_{A,j}$, $Bj = d_{B,j}$, and $Cj = d_{C,j}$, and $X1_C$ and $X2_C$ are from equation 2.

Figure 5:
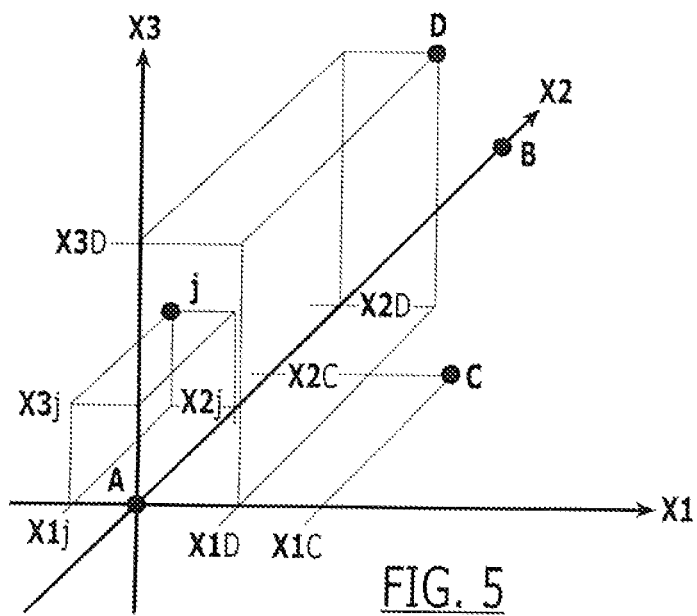
FIG. 5 is an illustration showing how the X1, X2, and X3 values are created in the present invention for all dataset points, illustrated by point j, using points A, B, C and D and the X1, X2 and X3 axes.

Turning to FIG. 5, a processor step 6 is illustrated in which points A, B, C and D are used to find the 3D Cartesian coordinates for the rest of the points in the dataset while preserving angles information for or from each point in the dataset. The X1, X2 and X3 values of any point j as depicted in FIG. 5 are calculated using equations 5a-c of Table 5. Equation 5d is used to find point E where the X4 axis will be created in a similar manner as used to find point D from equation 3c. Point E is found such that the perpendicular distance from point E to the A-B-C-D hyperplane, also referred to as the X1-X2-X3 hyperplane, is maximum. The point j having that maximum distance, denoted as $X4_j$, is labeled point E. The Cartesian coordinates of point E are thus denoted as ($X1_E$, $X2_E$, $X3_E$, $X4_E$) for a 4D space.

TABLE 5

Cartesian Coordinates for Reminder of Points.

$$X2_j = (AB^2 + Aj^2 - Bj^2)/(2 * X2_B) = (AB^2 + Aj^2 - Bj^2)/(2AB) \quad (5a)$$
$$X1_j = (AC^2 + Aj^2 - Cj^2 - 2 * X2_C * X2_j)/(2 * X1_C) \quad (5b)$$
$$X3_j = (AD^2 + Aj^2 - Dj^2 - 2 * X1_D * X1_j - 2 * X2_D * X2_j)/(2 * X3_D) \quad (5c)$$
$$X4_j^2 = Aj^2 - X1_j^2 - X2_j^2 - X3_j^2 \quad (5d)$$
Where: $AB = d_{A,B}$, $AC = d_{A,C}$, $BC = d_{B,C}$, $Cj = d_{C,j}$, $Aj = d_{A,j}$, $Bj = d_{B,j}$, and $Cj = d_{C,j}$ and $X1_C$ and $X2_C$ are from equation 2.

In processor step 7, the prior processor steps of 5 and 6 are repeated to create a total of L axes, where L represents the maximum number of visualization axis (VA1, VA2, VA3, . . . , VL) in the hyperspace dataset. The maximum number of visualization axis (L) is less or equal to the smaller number of the M or N, the total number of points in the dataset or total number of variables in the dataset, respectively. This results in a set of Cartesian coordinates for all points in the hyperspace dataset. The forth visualization axis (VA4 or X4) and higher axis are not used in the 2D or 3D multivariate digital camera imaging 18, 20, and 22, in this invention. The first three coordinates, denoted as ($X1_j$, $X2_j$, $X3_j$) or (VA1, VA2, VA3), correspond to locations on the three axes created based on the maximum-distance values and the maintenance or preservation of relative-angles information between points (steps 1-6) as described herein. The images produced in a form suitable for human viewing as described below and in reference to illustrations of FIGS, 7, 9, 10, and 11 may be produced using these first three Cartesian coordinates for each point as obtained by the present invention.

In processor step 8, the data from step 7 is sent to one or more output devices, as labeled in FIG. 1 as 18, 20, and 22. This can be performed directly by computer processor 14 or through a post-processing output controller 24 for further data manipulating and formatting.

Tables 2-5 are summarized in the following Table to find the three visualization axis (VA1, VA2, VA3) as well as the 4$^{th}$ visualization axis. By looking at steps 3 and 4, we will be able to determine how to calculate the 5$^{th}$, 6$^{th}$, . . . and higher visualization axes.

1- Find the first visualization axis (VA1 ) by finding the two points (A, B) that has maximum distance in distance matrix .
   a. The fist VA1 or X2 will be passing through A and B
   b. X2 coordinate value for any point (j) will be calculated as follow:
   c. $X2j = (Aj^2 + AB^2 - Bj^2)/(2 * AB)$
   d. Where Aj = distance between point A and point j, AB = distance between point A and point B, Bj = distance between point B and point j 2- Find the second visualization axis (VA2) by finding, the third point (C or C) where it has the maximum perpendicular distance from A-B line or VA1 axis using the following equation:
   a. $X1_C^2 = AC^2 - (X2_C^2)$
   b. The second VA2 or X1 will pass through C and is perpendicular to VA1
   c. X1 coordinate value for any point (j) will be calculated as follow
   d. $X1j = (Aj^2 + AC^2 - Cj^2 - 2 * X2_C * X2_j)/(2 * X1_C)$
   e. Where Aj = distance between point A and point j, AC = distance between point A and point C, Cj = distance between point C and point j, $X2_j$ = X2 coordinate value of point j (step 1c), $X2_C$ = X2 coordinate value of point C (step 1c), $X1_C$ = X1 coordinate value of point C (step 2a).

3- Find the third visualization axis (VA3) by finding the fourth point (D or D) where it has the maximum perpendicular distance from A-B-C plane or VA1-VA2 plane using the following equation:
   a. $X3_D^2 = AD^2 - (X2_D^2) - (X1_D^2)$
   b. The third VA3 or X3 will pass through D and is perpendicular to VA1 and VA2 axis
   c. X3 = coordinate value for any point (j) will be calculated as follow
   d. $X3j = (Aj^2 + AD^2 - Dj^2 - 2 * X2_D * X2_j - 2 * X1_D * X1_j)/(2 *$ -continued X3$_D$)
e. Where Aj = distance between point A and point j, AD = distance between point A and point D, Dj = distance between point D and point j, X2$_j$ = X2 coordinate value of point j (step 1c), X2$_D$ = X2 coordinate value of point D (step 1c), X1$_D$ = X1 coordinate value of point D (step 2a), X1$_j$ = X1 coordinate value of point j (step 2d), X1$_D$ = X1 coordinate value of point D (step 2d), X3$_D$ = X3 coordinate value of point D (step 3a).

4- Find the fourth visualization axis (VA4) by finding the fifth point (E or E) where it has the maximum perpendicular distance from A-B-C-D) hyper-plane or VA1-VA2-VA3 hyper-plane using the following equation:
a. X4$_E^2$ = AE$^2$ − (X2$_E^2$) − (X1$_E^2$)
b. The fourth VA4 or X4 will pass through E and is perpendicular to VA1, VA2 and VA3 axis
c. X4 coordinate value for any point (j) will be calculated as follow
d. X4j = (Aj$^2$ + AE$^2$ − Ej$^2$ − 2 * X2$_E$ * X2$_j$ − 2 * X1$_E$ * X1$_j$ − 2 * X3$_E$ * X3$_j$)/(2 * X4$_E$)
e. Where Aj = distance between point A and point j, AE = distance between point A and point E, Ej = distance between point E and point j, X2$_j$ = X2 coordinate value of point j (step 1c), X2$_E$ = X2 coordinate value of point E (step 1c), X1$_E$ = X1 coordinate value of point E (step 2a ), X1$_j$ = X1 coordinate value of point j (step 2d), X1$_E$ = X1 coordinate value of point E (step 2d), X3$_E$ = X3 coordinate value of point E (step 3a)., X3$_j$ = X3 coordinate value of point j (step 3d), X3$_E$ = X3 coordinate valueof point E (step 3d), X4$_E$ = X4 coordinate value of point E (step 4a).

Having the described the device and method of the present invention, attention is now turned to its use and a comparison (qualitative and quantitative) with a prior art method. In this section the present invention is referred to as the visualization axis approach or VAA. The evaluation of VAA and its comparison with the prior art PCA method was performed using the method described in Table 6.

TABLE 6

Method used to compare VAA with PCA.

Step 1. Total distance TD$_o$ between all points in the original data matrix R$_{MxN}$ is calculated by summing all entries d$_{i,j}$ of the original distance matrix D$_{MxM}$.
Step 2. The total distance TD3 between all points in the down-mapped 3D space is also calculated by summing all entries d$_{i,j}$ of the down-mapped 3D distance matrix D3$_{MxM}$. d3$_{i,j}$ = the distance between point i and j in the 3D space.
Step 3. Performance is estimated by calculating the ratio between TD3 to TD$_o$. The performance ratio is the explained fraction of total distance of all points of the >3D hyperspace object in 3D space.
Step 4. Furthermore, the performance contribtaion of each visualization axis VA1, VA2 and VA3 in 3D space can be evaluated in a similar fashion to those using, steps 1-3.
Step 5. Total distance TD1 between all points in the down-mapped 1D space, VA1 axis only, is calculated by summing all entries d1$_{i,j}$ of the down-mapped 1D distance matrix D1$_{MxM}$. d1$_{i,j}$ = the distance between point i and j in 1D space o the VA1 axis only.
Step 6. The performance contribution of VA1 is estimated by calculating the ratio between TD1 to TD$_o$.
Step 7. The total distance TD2 between all points in the down mapped 2D space, VA1 and VA2, is calculated by summimg all entries d2$_{i,j}$ of the down-mapped 2D distance matrix D2 $_{MxM}$. d2$_{i,j}$ = the distance between point i and j in 2D space or the VA1-VA2 plane.
Step 8. The performance contribution of both VA1 and VA2 is estimated by calculating the ratio between TD2 to TD$_o$.
Step 9. The performance contribution of VA2 only is calculated by subtracting the step 8 value from the step 6 value.
10- The performance contribution of VA3 only is calculated by subtracting the step 3 value from the step 8 value.

A computer program was written in the C++ language to perform the VAA imaging of the present invention as described in processor steps 1-8 as well as the analysis and comparison process described in Table 6 above. Three well known public library datasets were used in this evaluation, which are referred to as the Swiss-roll, Punctured Sphere, and Wine Dataset, respectively. In addition, a cylinder-within-a-cylinder object was synthesized and used.

Figure 6:
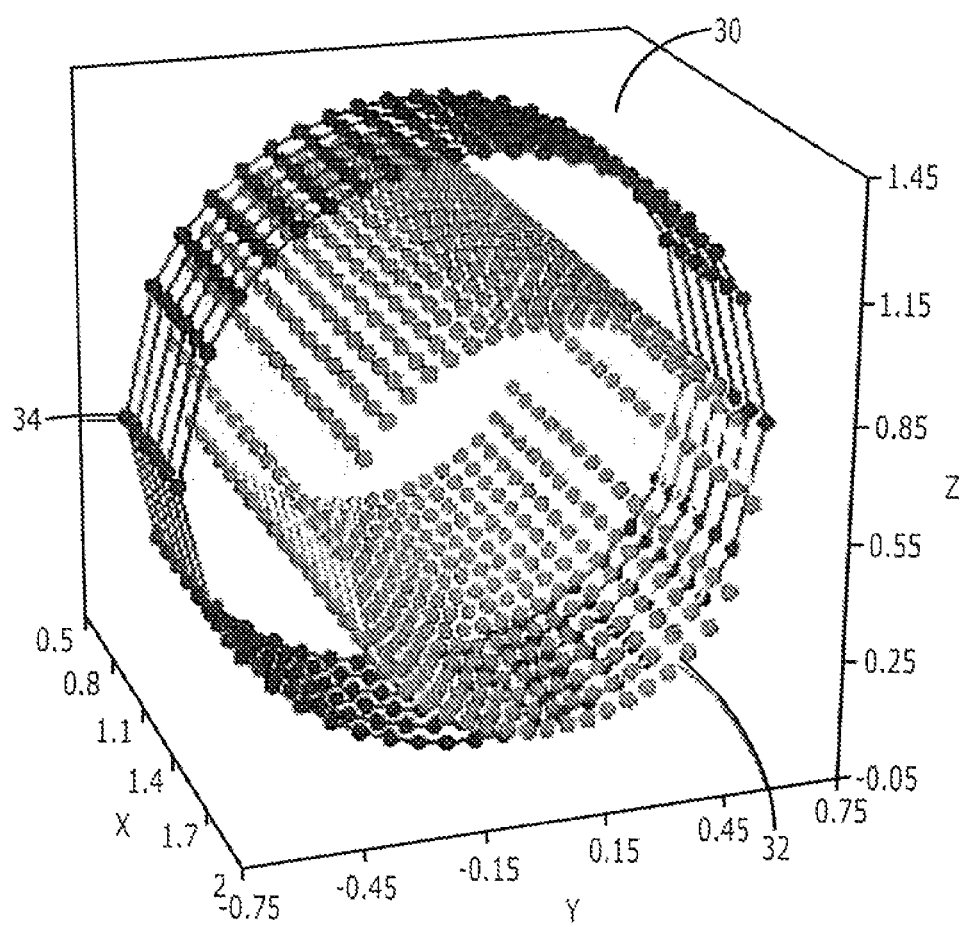
FIG. 6 is as plat of a 3D dataset object characterized as a cylinder within a cylinder.

Turning to FIG. 6, the cylinder-within-a-cylinder object 30 is illustrated. In this dataset example, the inner cylinder 32 is three times longer than the outer cylinder 34. The inner cylinder diameter is about two thirds of the outer cylinder diameter. Using any 3D commercially available plotting software, it is easy to rotate and select a viewing perspective that clearly shows the two cylinders, as was done to produce the image of FIG. 6. A suitable and robust algorithm for dimensional reduction will preserve the higher dimensional object's characteristics when translated into a lower dimension 2D or 3D format for viewing. This can be tested by using a computer-based, automated process to reduce a 3D image to 2D and then comparing the resulting 2D images with those produced by manual manipulation of the 3D data. This is only possible with a 3D dataset because the original dataset can be visualized and therefore an optimized viewing perspective can be selected manually to produce one or more 2D plots for comparison with those produced by the computer-based, automated process.

Turning to FIGS. 7A through 7F, the results of using the VAA present invention and a PCA prior art method are shown for comparison purposes. VAA was used to produce three visualization axes and three visualization planes presented in FIGS. 7A through 7C. As illustrated, the VA1-VA3 and VA2-VA3 planes 40, 42 represent satisfactory angles that very closely translate the 3D characteristics of the two-cylinder object into the 2D plot. PCA as applied to the same raw dataset produced three principal components and three planes presented in FIGS. 7D through 7F. As illustrated in this particular example, PCA provides useful information, but none of the three PCA plots in 2D resemble the 3D cylinder-within-a-cylinder object in comparison with that provided by two of the VAA plots 40, 42. In other words, two of the VAA plots 40, 42 are more picture-like in quality than the three PCA plots.

Figure 8:
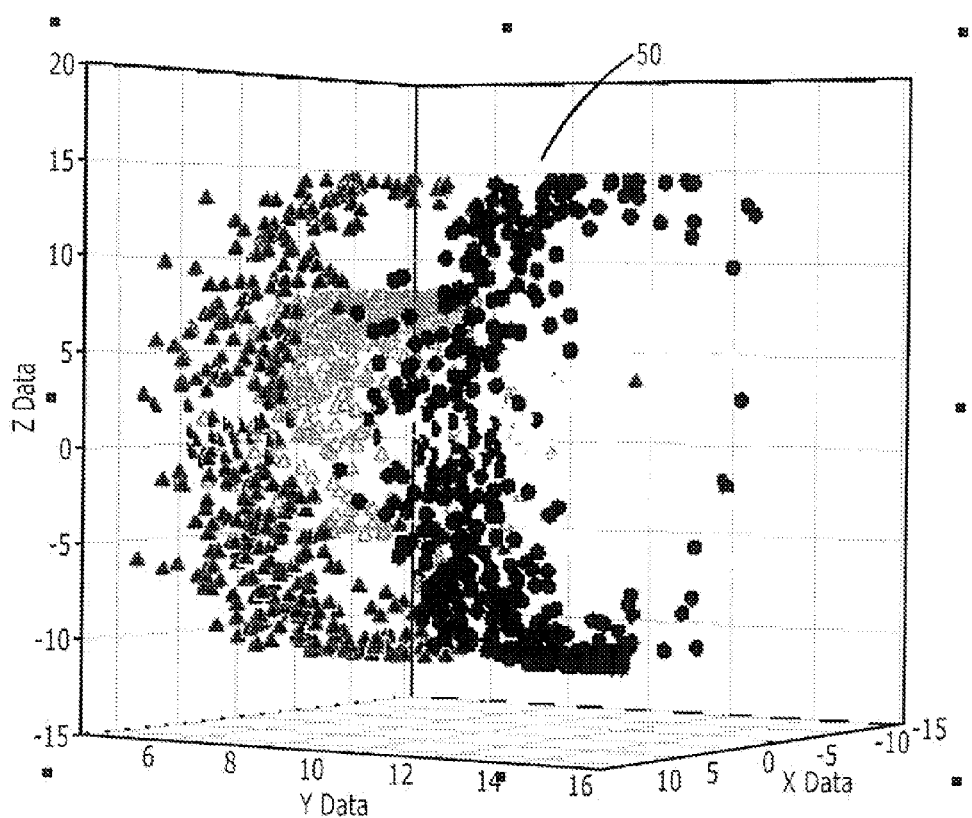
FIG. 8 is a plot of a 3D dataset known as the Swiss-roll which is characterized as a nonlinear manifold.
Figure 9A:
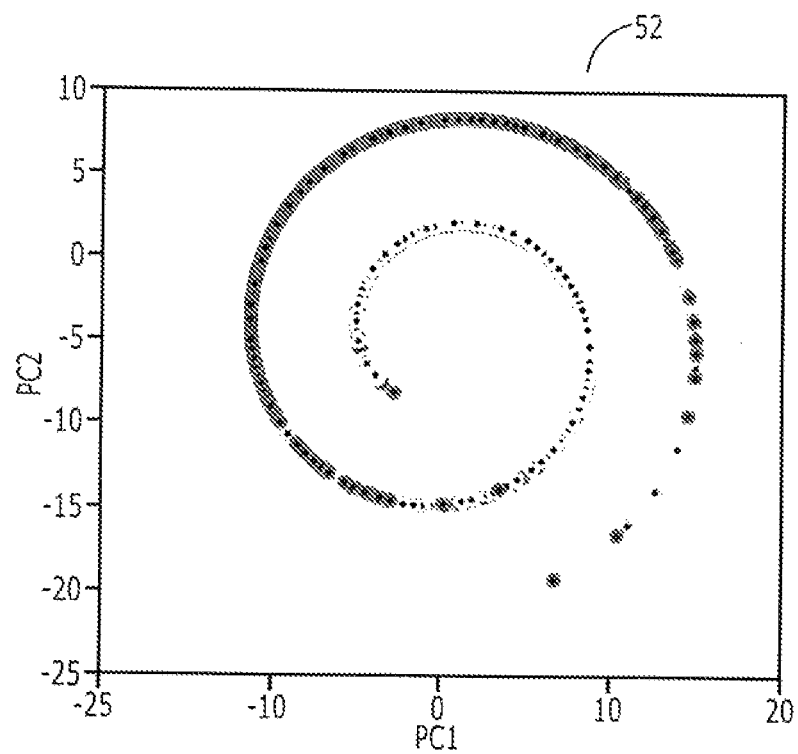
FIGS. 9A and 9B show a comparison of visualizations of the Swiss-roll dataset illustrated in FIG. 8 using the present invention and the PCA prior art.
Figure 9B:
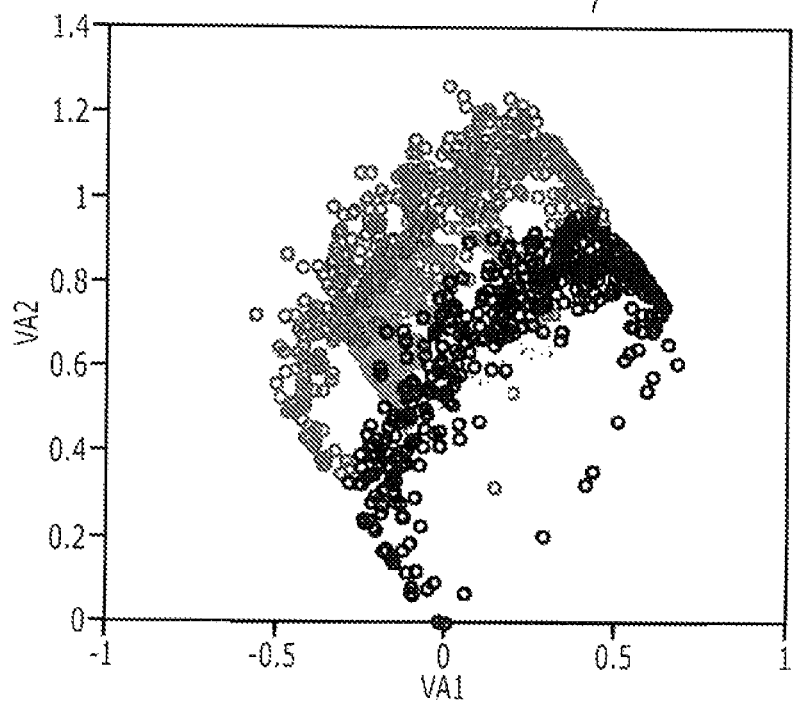

Turning to FIGS. 8 and 9A and 9B, a 2D plot of a 3D dataset object 50 known as the Swiss-roll is illustrated. This dataset is well known and can be characterized as a nonlinear manifold with to characteristic. The dataset is illustrated in FIG. 8 with a picture-like quality using a commercially available 3D plotting software and manual manipulation of the viewing perspective. The resulting PCA plot 52 and VAA plot 54 of the Swiss-roll dataset are illustrated in FIGS. 9A and 9B, respectively. As shown, the PCA plot 52 captures the spiral characteristic of the dataset very well, but the 2D representation provided by PCA does not have picture-like qualities in comparison to the manually manipulated plot 50 of FIG. 8 or the VAA-generated plot 54 of FIG. 9B. It should be emphasized here that the manual manipulation that was used to produce plot 50 of FIG. 8 is not possible with hyperspace data, so the original dataset for a hyperspace object would be viewed only with a plot equivalent to PCA plot 52 or VAA plot 54 of FIGS. 9A and 9B without the benefit of seeing plot 50. The more picture-like quality of plot 54 compared with plot 52 would be very helpful in such a situation.

The comparison shown in FIGS. 9A and 9B illustrates vital advantage provided by the VAA present invention. This advantage may be attributed to its retention of distances and angles information between all points in the dataset when reducing the dimension from 3D space to 2D space. The processing steps of the VAA method can also be characterized as a maximum-distance method in reference to how the axes are constructed. The limitation of PCA as illustrated in this example, and the corresponding advantage of the present invention, may be due to the non-linear manifold properties of the dataset. While PCA may have advantages in applications such as data compression and visualization of other types of hyperspace datasets, the non-linear manifold type properties illustrated in this dataset occur in real world datasets that must be analyzed and visualized by scientists and researchers. Accordingly, both VAA and PCA have utility as tools for use in science and research.

Turning to FIGS. 10A through 10D, a Punctured Sphere model 56 is illustrated. This is another non-linear manifold dataset presented in the literature. For the purposes of this comparison, the analysis and plots of charts 34 and 35 in the following document are incorporated by reference: "Manifold Learning Techniques: So which is the best?", Todd Wittman, Gilad Lerman, Department of Mathematics, University of California, Los Angeles, Spring 2005, slide 34-35. These charts have been published (for example, at website http://www.math.ucla.edu/~wittman/mani/mani_presentation.pdf) and are available or otherwise understood from the following description by those skilled in the art to which the invention pertains.

As noted in the reference and illustrated in FIG. 10A herein, the punctured sphere sampling of points is sparse at the bottom 58 and dense at the top 60. Note that this sparse-dense sampling density refers to the proximity of data points to one another and not to the orifice at either end of the punctured sphere where there are no data points. All eight MVA methods analyzed and illustrated in the referenced material at chart 35 show an extensive degree of image distortion of punctured sphere 56. Some MVA methods produce totally unrecognizable 2D figures or representations of punctured sphere 56. This image distortion is due to the fact that the various MVA methods use functions or models that force the raw data points to be collapsed, flattened, or unrolled in a certain way. For example, PCA projects the sphere from the side, MDS and ISOMAP turn the sphere inside-out, and the other five MVA methods tend to flatten punctured sphere 56 and give too much emphasis to the sparse region 58. As illustrated in VAA plots 62, 64, and 66 of FIGS. 10C, 10B, and 10D, respectively, the present invention produces a picture-like 2D image quality of this dataset.

Turning to FIGS. 11A through 11H, a comparison of VAA and PCA is illustrated using the multivariate dataset know as the Italian Wine Dataset. Given the hyperspace nature of this dataset, which is thirteen dimensions, it cannot be plotted using commercially available software as in the previous examples. The Italian wine dataset consists of 178 rows representing wine samples and 13 columns representing the measured variables. In addition, it is divided into three classes according to location. The three classes are Barolo, Grignolino, and Barbera. The thirteen measured variables that describe different wine characteristics are: alcohol, malic acid, ash, alkalinity of ash, magnesium, total phenols, flavonoids, non-flavonoid phenols, proanthocyanins, color intensity, hue, OD280/OD315 of diluted wines, and proline.

The Barolo class is illustrated in FIGS. 11A through 11H in open triangles, with the Barbera class shown in open circles and the Grignolino class in solid circles.

The tabulated values 68 for VAA and 70 for PCA provide the percentage of information contained in the respective VAA and PCA planes. These values were calculated using the method describe in Table 6.

The tabulated values 70 for PC1, PC2 and PC3 represent 66.3% of the total information of the dataset, while the corresponding tabulated values 68 for VA1, VA2 and VA3 represent 69.3% of the total information in the dataset using the method described in Table 6. Thus the results obtain by VAA and PCA on this dataset were similar in this regard, but with VAA resulting in a slight advantage.

Both the VAA plots 72 and the PCA plots 74 provide useful visualizations of the data. The center VAA plot 76 arguably provides the best picture-like quality in the tighter clusters of points for the three wine datasets while still showing the resolution or dispersion of individual points. Likewise, PCA plot 78 also provides relative good clustering of wine by class with dispersion of individual points, but appears less picture-like in resolving the shapes formed by the three wine datasets.

As illustrated and described herein, the present invention utilizes a maximum-distance means to generate axes for dimensional reduction in such a way that preserves the relative angles information from each point in the dataset, thus providing the capability to produce a more picture-like image for human viewing. While a specific exemplary embodiment of the invention has been described, it will be understood that additional embodiments and various modifications may be made without departing from the spirit and scope of the invention. Accordingly, these and other embodiments of the invention fall within the scope of the claims below.

What is claimed is:

1. A multivariate digital camera device for generating pictures of a hyperspace dataset, comprising:
   an input device for receiving the hyperspace dataset;
   a computer processor for receiving said hyperspace dataset from said input device and mathematically projecting said hyperspace dataset onto a surface that can be visualized;
   an output device for producing a representation of the surface that can be visualized as received from said computer processor;
   wherein said computer processor performs the steps of:
   (a) constructing a distance matrix from the dataset comprised of points in hyperspace;
   (b) finding points A and B in the hyperspace dataset and defining an X2 axis using a first maximum distance value as obtained within said distance matrix;
   (c) finding point C in the hyperspace dataset using a second maximum distance value as calculated from the X2 axis to construct an X1 axis;
   (d) calculating (x1, x2) Cartesian coordinates for all points in the hyperspace dataset using the X1 and X2 axes;
   (e) finding point D in the hyperspace dataset using a third maximum distance value as calculated from an X1-X2 plane defined by the X1 and X2 axes to construct an X3 axis;
   (f) calculating (x1, x2, x3) Cartesian coordinates for all points in the hyperspace dataset using the X1, X2, and X3 axes;
   (g) repeating steps (e) and (f) for each succeeding higher dimension in the hyperspace dataset; and
   (h) sending data obtained from step (g) to said output device for producing said representation of the surface that can be visualized.

2. The device of claim 1, wherein said input device is selected from the group consisting of a keyboard, a laboratory instrument, a reader of computer readable medium, and a network device.

3. The device of claim 2, wherein said output device is selected from the group consisting of a 2D printer and a 3D printer.

4. The device of claim 3, wherein said output device also includes as monitor.

5. A method for generating pictures of a dataset comprised of points in hyperspace, comprising:
   (a) constructing a distance matrix from the dataset comprised of points in hyperspace;

(b) finding points A and B in the hyperspace dataset and defining an X2 axis using a first maximum distance value as obtained within said distance matrix;
(c) finding point C in the hyperspace dataset using a second maximum distance value as calculated from the X2 axis to construct an X1 axis;
(d) calculating (x1, x2) Cartesian coordinates for all points in the hyperspace dataset using the X1 and X2 axes;
(e) finding point D in the hyperspace dataset using a third maximum distance value as calculated from an X1-X2 plane defined by the X1 and X2 axes to construct an X3 axis;
(f) calculating (x1, x2, x3) Cartesian coordinates for all points in the hyperspace dataset using the X1, X2, and X3 axes;
(g) repeating steps (e) and (f) for each succeeding higher dimension in the hyperspace dataset; and
(h) sending data obtained from step (g) to an output device for generating a non-transitory picture of the dataset comprised of points in hyperspace as represented by the calculated (x1, x2, x3) Cartesian coordinates.

6. A non-transitory computer readable medium storing a program causing a computer to execute a process, the process comprising:

(a) constructing a distance matrix from the dataset comprised of points in hyperspace;
(b) finding points A and B in the hyperspace dataset and defining an X2 axis using a first maximum distance value as obtained within said distance matrix;
(c) finding point C in the hyperspace dataset using a second maximum distance value as calculated from the X2 axis to construct an X1 axis;
(d) calculating (x1, x2) Cartesian coordinates for all points in the hyperspace dataset using the X1 and X2 axes;
(e) finding point D in the hyperspace dataset using a third maximum distance value as calculated from an X1-X2 plane defined by the X1 and X2 axes to construct an X3 axis;
(f) calculating (x1, x2, x3) Cartesian coordinates for all points in the hyperspace dataset using the X1, X2, and X3 axes;
(g) repeating steps (e) and (f) for each succeeding higher dimension in the hyperspace dataset; and
(h) sending data obtained from step (g) to an output device for generating a non-transitory picture of the dataset comprised of points in hyperspace as represented by the calculated (x1, x2, x3) Cartesian coordinates.

* * * * *